United States Patent Office 2,791,566
Patented May 7, 1957

2,791,566

CATALYST RECOVERY PROCESS

Francis George Jeffers, Blackley, Manchester, England, assignor to Imperial Chemical Industries Limited, a corporation of Great Britain No Drawing. Application September 14, 1954,
Serial No. 456,059

Claims priority, application Great Britain
September 16, 1953

4 Claims. (Cl. 252—464)

This invention relates to a catalyst recovery process and more particularly to the recovery of catalyst and other by-products from the waste liquors obtained in the manufacture of adipic acid by nitric acid oxidation of cyclohezanol and/or cyclohexanone.

Various catalysts have been proposed for use in the nitric acid oxidation of cyclohexanol and/or cyclohexanone. Thus, for example, in British Patent No. 572,260 it is proposed to use vanadium and copper either as such or in the form of their oxides or salts. The waste liquors obtained after isolation of the adipic acid by filtration contain valuable amounts of catalyst salts and by-product organic acids such as glutaric acid and succinic acid. When the recovery of these catalyst salts and by-products is attempted by first evaporating the waste liquors to dryness, a vigorous oxidation reaction occurs causing a rapid rise in temperature and rendering the recovery hazardous.

It has now been found that this difficulty can be overcome by addition to the waste liquors, prior to evaporation to dryness, of a relatively non-volatile mineral acid, for example, sulphuric acid.

Thus according to the present invention there is provided a process for the recovery of catalyst and by-products from the waste liquors obtained in the manufacture of adipic acid by nitric acid oxidation of cyclohexanol and/or cyclohexanone which comprises adding to the waste liquors a relatively non-volatile mineral acid in an amount slightly more than equivalent to the nitrate salts present, evaporating the liquors until substantially all water and nitric acid has been removed and isolating the catalyst and by-products from the residue.

The mineral acid to be added to the waste liquors must be capable of displacing nitric acid from its salts. Suitable mineral acids are sulphuric acid and phosphoric acid.

The evaporation to dryness of the waste liquors, containing the added mineral acid is preferably performed under reduced pressure. It is also convenient to blow air through the hot molten residue in order to remove any remaining small amount of nitric acid. Owing to the presence of the added mineral acid the whole of the nitric acid, both free and that originally combined as salt, is removed and the acids/catalyst mixture can then be safely processed further, e. g., alcohols may be added (for ester formation, etc.) without danger of exothermic reactions, which occur when nitrates are present in the acids.

The catalyst may be isolated from the residue after evaporation to dryness by any convenient method. Thus the molten residue may be filtered; the sulphates of the catalyst metals are much less soluble in the molten residue than are the nitrates and accordingly by the process of this invention, such a simple separation is quite effective. Or the residue may be dissolved in an organic solvent such as ethylene dichloride, or benzene and the catalyst may then be isolated by filtration. Or the residue may be treated with an alcohol in order to esterify the acid and the catalyst may then be isolated by filtration. Or the residue may be distilled in order to remove the organic acids.

The organic acids contained in the residue, consisting largely of glutaric acid with some adipic acid and succinic acid, may be used as such for the manufacture of mixed esters or of other products. Alternatively, the individual acids may be isolated, for example by esterification, fractionation of the esters, and subsequent hydrolysis of the pure esters.

The invention is illustrated but not limited by the following examples in which parts are by weight.

Example 1

To 1150 parts of adipic acid mother liquors such as are obtained by the operation of the process of British Patent No. 572,260 containing salts of vanadium and copper, are added 20 parts of sulphuric acid and the mixture is evaporated with agitation at 20–150 mms. of Hg pressure and 35–70° C. As the evaporation proceeds, the temperature gradually increases and a final temperature of 95–100° C. at 20–150 mms. of Hg pressure is maintained until distillation ceases. The semi-molten acids are blown with air at 95–100° C. for 1–5 hours until they are completely free of nitric acid, and then heated to above 130° C. and the insoluble catalyst salts are filtered off on a heated pressure filter. A filter-aid e. g. kieselguhr may be added if required, to assist the filtration. The catalyst salts are obtained substantially free from organic matter and are suitable when dissolved in nitric acid for direct re-use in the oxidation of cyclohexanol etc. to adipic acid.

The filtered organic acids can be processed further to yield either pure component acids of technically useful mixtures e. g. by one or more of the following processes: sweating, solvent extraction, distillation or esterification.

Example 2

To 500 parts of adipic acid mother liquors, such as are obtained by the operation of the process of British Patent No. 572,260, containing salts of vanadium and copper are added 4.6 parts of syrupy phosphoric acid and the mixture is evaporated with agitation at 20–150 mms. of Hg pressure and 35–70° C. As the evaporation proceeds the temperature gradually increases and a final temperature of 95–100° C. at 20–150 mms. of Hg pressure is maintained until distillation ceases. The residual acids are blown with air at 800° C. until they are completely free of nitric acid, and then heated above 130° C. and the insoluble catalyst salts are filtered off on a heated pressure filter. The catalyst salts are obtained substantially free from organic acids and when dissolved in nitric acid can be re-used in the oxidation of cyclohexanol etc. to adipic acid. The filtered acids can be processed further as in Example 1.

What I claim is:

1. A process for the recovery of copper-vanadium catalyst and by-products from the waste liquors obtained in the manufacture of adipic acid by nitric acid oxidation of cyclohexanol and cyclohexanone which comprises adding to the waste liquors a substantially non-volatile mineral acid in an amount slightly more than equivalent to the nitrate salts present, heating the liquors until substantially all water and nitric acid have been evaporated therefrom, heating the resulting residue to a temperature of at least 130° C., and isolating the catalyst and by-products from the residue.

2. Process for the recovery of copper-vanadium catalyst and by-products as claimed in claim 1 wherein the evaporation of the liquors is performed under reduced pressure.

3. Process for the recovery of copper-vanadium catalyst and by-products as claimed in claim 1 wherein the catalyst is isolated from the residue by filtration.

4. Process for the recovery of copper-vanadium catalyst and by-products as claimed in claim 1 wherein the mineral acid is sulphuric acid.

References Cited in the file of this patent

FOREIGN PATENTS

| | | |
|---|---|---|
| 265,959 | Great Britain | Dec. 8, 1927 |
| 572,260 | Great Britain | Sept. 28, 1945 |